(12) United States Patent
Kimhi

(10) Patent No.: US 11,436,862 B2
(45) Date of Patent: Sep. 6, 2022

(54) PRIVACY PROTECTION CAPTURING MODULE

(71) Applicant: EMZA VISUAL SENSE LTD., Givatayim (IL)

(72) Inventor: Tomer Kimhi, Tel Aviv (IL)

(73) Assignee: EMZA VISUAL SENSE LTD., Givatayim (IL)

( * ) Notice: Subject to any disclaimer, the term of this patent is extended or adjusted under 35 U.S.C. 154(b) by 0 days.

(21) Appl. No.: 17/405,058

(22) Filed: Aug. 18, 2021

(65) Prior Publication Data

US 2022/0075989 A1    Mar. 10, 2022

(30) Foreign Application Priority Data

Sep. 8, 2020 (IL) .......................................... 277206

(51) Int. Cl.
| | | |
|---|---|---|
| *G06V 40/16* | (2022.01) | |
| *G06F 21/62* | (2013.01) | |
| *G06V 20/30* | (2022.01) | |
| *G06F 21/60* | (2013.01) | |

(52) U.S. Cl.
CPC ........ *G06V 40/167* (2022.01); *G06F 21/6245* (2013.01); *G06V 20/30* (2022.01); *G06V 40/172* (2022.01); *G06F 21/604* (2013.01)

(58) Field of Classification Search
CPC ........... G06K 9/00228; G06K 9/00261; G06K 9/00677; G06F 21/60; G06F 21/604; G06F 21/6245; H04L 63/0428; G06V 20/30; G06V 40/61; G06V 40/167
See application file for complete search history.

(56) References Cited

U.S. PATENT DOCUMENTS

| | | | |
|---|---|---|---|
| 9,298,931 B2 * | 3/2016 | Ur ........................... | G06F 21/00 |
| 9,396,354 B1 * | 7/2016 | Murphy ................ | H04L 9/3231 |
| 2004/0081338 A1 * | 4/2004 | Takenaka ........... | G08B 13/1961 |
| | | | 382/118 |
| 2008/0001573 A1 * | 1/2008 | Carey ............... | H01M 10/0436 |
| | | | 320/112 |

* cited by examiner

*Primary Examiner* — Daniel G Mariam
(74) *Attorney, Agent, or Firm* — Alphapatent Associates, Ltd; Daniel J. Swirsky

(57) ABSTRACT

A privacy protecting capturing module including a capture device, a memory unit storing at least part of an image captured by the capture device, an interface for receiving commands and transmitting information, and a processor, executing receiving a first image captured by the capture device, analyzing the first image and determining whether the first image meets a condition, subject to the condition being met, transmitting information related to the first image through the interface, receiving a second image captured by the capture device consequent to the first image, analyzing the second image and determining whether the second image meets a second condition, and subject to the second condition being met, prohibiting transmission of further information through the interface, where all accesses to the privacy protecting capturing module are through the interface, and no direct access is enabled to the capture device or to the memory unit.

19 Claims, 3 Drawing Sheets

PRIVACY PROTECTION CAPTURING MODULE

FIELD

The present disclosure relates to capture devices in general, and to a privacy protection capturing module, in particular.

BACKGROUND

Nowadays many devices and applications comprise and use capture devices including cameras for multiple applications and uses, including photography, teleconferencing, social networks activities, security, entertainment, or the like. In particular, cameras are contained in and used by mobile devices such as mobile phones, laptops, tablets, or the like.

Once it is enabled to stream or otherwise output from the device images captured by a camera of the device, the privacy of a user may be compromised, since the camera may be in operating mode and capturing and transmitting images, and may transmit them to locations such as a destination computer, phone, server and the like, whether approved by the user for certain purposes (but not for others) or not.

SUMMARY

One exemplary embodiment of the disclosed subject matter is a privacy protecting capture device, including a capture device a memory unit for storing at least a part of an image captured by the capture device, an interface for receiving commands and transmitting information, and a processor, executing receiving a first image captured by the capture device, analyzing the first image and determining whether a condition is met in the first image, subject to the condition being met, transmitting information related to the first image through the interface, receiving a second image captured by the capture device, the second image consequent to the first image, analyzing the second image and determining whether a second condition is met in the second image, and subject to the second condition being met in the second image, prohibiting transmission of further information through the interface, where all accesses to the privacy protecting capturing module are through the interface, and no direct access is enabled to the capture device or to the memory unit. Within the privacy protecting capturing module, the processor is optionally further adapted to receive a third image, consequent to the second image, determine whether the condition or the second condition is met in the third image, and subject to the condition or the second condition being met in the third image, resume transmission of further information related through the interface. Within the privacy protecting capturing module, the capture device, the memory device and the processor are optionally pre-assembled as part of the module. Within the privacy protecting capturing module, the capture device, the memory device and the processor are optionally implemented on a single chipset or on stacked chips. Within the privacy protecting capturing module, the capture device, the memory device and the processor are optionally implemented on a single chip. Within the privacy protecting capturing module, the condition optionally relates to identifying that a face is being captured in an image. Within the privacy protecting capturing module, the condition optionally relates to identifying that a face selected from a predefined collection of faces is being captured in an image. Within the privacy protecting capturing module, the condition optionally relates to a maximal or minimal number of people being captured in an image. Within the privacy protecting capturing module, the condition optionally relates to a given location being captured in an image. Within the privacy protecting capturing module, the processor may further receive an indication to an operation mode from a device the privacy protecting capturing module is installed in, and where determining whether a condition is met in the first image or in the second image optionally depends on the operation mode. Within the privacy protecting capturing module, the information is optionally the first image or the second image as captured. Within the privacy protecting capturing module, the information is optionally the first image or the second image as manipulated by the processor. Within the privacy protecting capturing module, the information is optionally a product of processing the first image or the second image by the processor. Within the privacy protecting capturing module, determining whether a condition is met in the first image or in the second image optionally relates to the condition being met in at least a predetermined percentage out of a predetermined number of consecutive images. Within the privacy protecting capturing module, the processor is a optionally a signal processor. Within the privacy protecting capturing module, the second condition is optionally identical to the first condition.

Another aspect of the disclosure is a computerized method performed by a processor, including receiving a first image captured by a capture device, analyzing the first image and determining whether a condition is met in the first image, subject to the condition being met, transmitting information related to the first image through an interface of the processor, the interface adapted to receive commands and transmit information, receiving a second image captured by the capture device, the second image consequent to the first image, analyzing the second image and determining whether a second condition is met in the second image, and subject to the second condition being met in the second image, prohibiting transmission of further information through the interface, where all accesses to the privacy protecting capturing module are through the interface, and no direct access is enabled to the capture device or to a memory unit associated with the processor.

Yet another aspect of the disclosure is a computer program product including a computer readable storage medium retaining program instructions, which program instructions when read by a processor, cause the processor to perform a method including receiving a first image captured by a capture device, analyzing the first image and determining whether a condition is met in the first image, subject to the condition being met, transmitting information related to the first image through an interface, receiving a second image captured by the capture device, the second image consequent to the first image, analyzing the second image and determining whether a second condition is met in the second image, and subject to the second condition being met in the second image, prohibiting transmission of further information through the interface, where all accesses to the privacy protecting capturing module are through the interface to the processor, and no direct access is enabled to the capture device or to a memory unit associated with the processor.

BRIEF DESCRIPTION OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
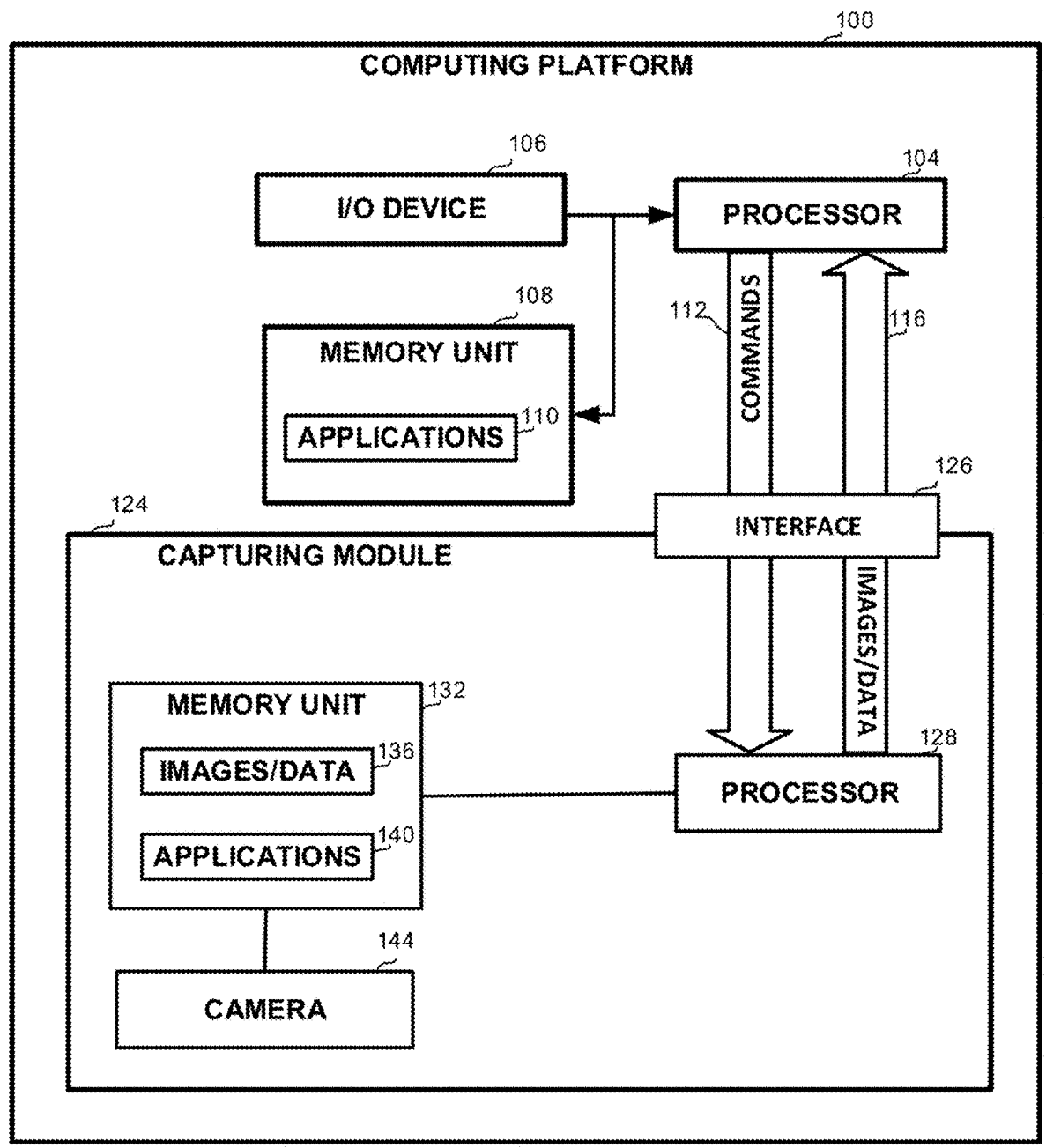
FIG. 1A is a block diagram of a computing platform including a capturing module, in accordance with some exemplary embodiments of the disclosed subject matter.

Unless specifically stated otherwise, the term "image" used in the specification should be expansively construed to cover any non-destructive capturing of an object, including, but not limited to, capturing by an optical device using any wavelength range(s), including still images, video frames, video clips, thermal image, or the like.

One technical problem addressed by this disclosure is that the usage of applications executed by computing devices, which involve capturing images, may lead to compromising the privacy of a user of the device. For example, the user may use an application that involves capturing video, such as a teleconference application with video. When the user occasionally leaves the computer, the camera keeps capturing and transmitting the captured images, for example the user's premises, the user in a private situation, another person passing in front of the camera, or the like. Such problems increase in today's working environment where more and more people often work from home and participate in lengthy conferencing sessions.

One technical solution of the disclosure relates to a capturing module designed to improve privacy protection, wherein the module is installed as a unit of a computing platform such as a laptop computer, a desktop computer, a tablet, a mobile phone, a security device, or the like. The module may comprise a capture device such as a camera, and a processor adapted to perform certain analyses on the captured images, to verify that a certain condition holds. Only if the condition is indeed met, the images captured by the capture device, characteristics or processing result thereof, may be allowed to be transmitted to the computing platform. The module may comprise a storage device for storing one or more captured or processed images, characteristics of the images, or processing results. The only way to access the capturing module and any data contained therein is through the defined interface of the module, whose access protocol may be published as an Application Interface (API), such that no component of the computing platform, nor any another computing platform can access the capture device or the storage device. Thus, the images are transmitted only if the processor of the capturing module so determines, and cannot be accessed if the processor prohibits such access. The processor may execute one or more dedicated applications, which check the condition, and which form an integral part of the capturing module. The camera and the storage device of the capturing module can be accessed only by the processor through its designated interface, such that the processor cannot be circumvented, neither by legitimate applications of the computing platform, nor by a malicious application or operator.

The application(s) executed by the processor may check for one or more predetermined conditions, selected for example in accordance with an indication from an application executed by the computing platform, which calls the interface of the capturing module processor. Some exemplary conditions relate to but are not limited to any one or more of the following: a face or a full or partial human figure is captured in the image, wherein the face or human figure takes at least a predetermined percentage of the image pixels; a face which is recognized as one of a number of pre-stored faces; operating in only in a certain environment, such as in a predetermined room; operating only if a certain number of people are in the frame, or a number of people are within a specified range, operating in accordance with any of the above only if the condition holds for at least a predetermined period of time or number of frames, or the like.

It will be appreciated that some of the conditions may require a registration or preparation phase, for example storing images of one or more people or faces, such that when any of these people or faces is recognized, the images may be transmitted; capturing the environment wherein the capturing module is allowed to transmit only images captured in the environment, or the like.

In some embodiments, the relevant condition to be checked by the capture module application may be selected according to a parameter provided by the computing platform, in accordance with an application of the computing device started by a user. In other embodiments, the capture module may comprise a multiplicity of applications each associated with one or more conditions, from which the computing platform selects which one to call according to the computing platform application activated by the user.

Another technical solution of the disclosure relates to discontinuing the image transmission if the condition stops holding. For example, if a user sits in front of a computer in a conference video call and then gets up and leaves the computer, streaming the images may be stopped.

Yet another technical solution of the disclosure relates to resuming streaming if the condition is met again within a predetermined period of time, for example if the user comes back within the predetermined period of time.

One technical effect of the disclosure is thus providing a privacy protecting capture module installed within a computing platform, wherein the access to the capture module cannot be overridden, such that only subject to the occurrence of one or more defined conditions, one or more images may be transmitted from the capture module to the computing platform.

Referring now to FIG. 1A, showing a block diagram of a computing platform 100 having installed therein a capturing module 124, in accordance with some exemplary embodiments of the disclosed subject matter.

In some exemplary embodiments, computing platform 100 may comprise a processor 104, which may be a Central Processing Unit (CPU), a microprocessor, a Digital Signal Processor (DSP), a Graphical Processing Unit (GPU), an electronic circuit, an Integrated Circuit (IC) or the like. Processor 104 may be utilized to perform computations required by computing platform 100 or any of its subcomponents. Processor 104 may be configured to execute computer programs useful in performing the method of FIG. 2 below.

In some exemplary embodiments, one or more I/O devices 106, other than camera 144 comprised in capturing module 124, may be configured to receive input from and provide output to a user. In some exemplary embodiments, I/O devices 106 may be utilized to present to the user a user interface, let a user start an application, guide the user through registration of one or more conditions for one or more applications, or the like. I/O devices 106 may comprise a display, a projector, a speaker, a keyboard, a mouse, a touch screen or another pointing or tracking device, a voice activated device, or the like.

In some exemplary embodiments computing platform 100 may comprise a memory unit 108. Memory unit 108 may be a short-term storage device or long-term storage device. Memory unit 108 may be a persistent storage or volatile storage. Memory unit 108 may be a disk drive, a Flash disk, a Random Access Memory (RAM), a memory chip, or the like. Memory unit 108 may be a single memory device, or multiple interconnected memory devices which may be co-located or located in different locations and communicating via any communication channel. In some exemplary embodiments, memory unit 108 may retain program code operative to cause processor 104 to perform acts associated with any of the steps shown in FIG. 2 below. Additionally or alternatively, memory unit 108 may retain one or more applications 110 which may need to use capturing module 124, such as a teleconferencing application, a photography application, a capturing module registration application, or the like.

Capturing module 124 may comprise one or more capture devices such as camera 144, such as a still images camera, a video camera, a thermal camera, a multi spectral camera, a hyper spectral camera, or the like. In some exemplary embodiments, capturing module 124 may comprise one or more audio capturing devices such as a microphone. Camera 144 may comprise a housing, a lens system, a shutter, and additional components as known in the art.

Capturing module 124 may comprise processor 128, which may be a signal processor, a graphic processor (GPU) or an application specific processor (ASIC), for processing the images captured by camera 144, to analyze them and thus determine whether they should be transmitted to processor 104, and/or to derive further information from the images. Processor 128 or another component may implement exclusive interface 126 between processor 104 or any other module or component communicating with capturing module 124, and capturing module 124, such that no other component of capturing module 124 is accessible to an external device, and such that processor 128 is accessible only through the protocol or methods defined by interface 126. Interface 126 can be implemented as a separate physical component, as one or more accessible functions or methods of processor 128, or the like. If capturing module 124 comprises an audio capturing device, signal processor 128 may comprise audio signal processing capabilities.

Capturing module 124 can only be accessed, by any external component, through its predetermined interface 126 with signal processor 128. The interface can enable signal processor 128 to receive commands or other data 112, or to output captured images, manipulated images, or data derived or calculated from the images 116.

Capturing module 124 may comprise memory unit 132, which may be a short-term storage device or long-term storage device, a persistent storage or volatile storage. In some embodiments, memory unit 132 may be implemented as part of processor 128. Memory unit 108 of the computing platform may be a Flash disk, a Random Access Memory (RAM), a memory chip, or the like. Memory unit 108 may be a single memory device, or multiple interconnected memory devices. Memory unit 132 may store images/data storage 136 storing one or more images captured by camera 144, processed images, or data extracted from images captured by camera 144. Memory unit 132 may store one or more applications 140 to be executed by processor 128. The applications may include applications for registration of faces, full or partial bodies, architectural images or the like, continuous capturing, still image capturing, video streaming or the like. The applications may also perform analyses and/or manipulations on the images, such as determining whether a face appears in the image and what percentage of the image is covered by the face, determining whether the image represents one of a number of known faces as indicated during registration, determining whether the image was taken in a predetermined environment as indicated during registration, deleting or otherwise hiding, disguising or masking parts of an image, or the like.

Capturing module 124 may be installed within any such platform as an integrated module with no access to its internal components such as the memory unit or the camera. Moreover, capturing module 124 cannot be separated into its components, and its only interaction with other components must be through interface 126 of capturing module 124. Some implementations of limiting the interface are described in U.S. patent application Ser. No. 16/706,872 filed on Dec. 9, 2019, and assigned to the same assignee as the current application, incorporated herein in its entirety for any purpose.

It will be appreciated that there is no necessary one-to-one correspondence between capture-related applications 110 of computing platform 100, and applications 140 of capture module 124. Rather, two or more applications from applications 110 can call the same application of applications 140, one application from applications 110 can call two or more of applications 140 for setting different conditions or parameters, or the like.

Processor 128 may activate a required application from applications 140, in accordance with command 112 received from processor 104, and can transmit or stream the captured images 116 to processor 104.

In some embodiments, camera 144, memory unit 132, and signal processor 128 may be all implemented on a single integrated circuit (IC), or as two or more bonded and packaged ICs. In further implementations signal processor 128 and camera 144 may be bonded back to back, also referred to as stacked).

Figure 1B:
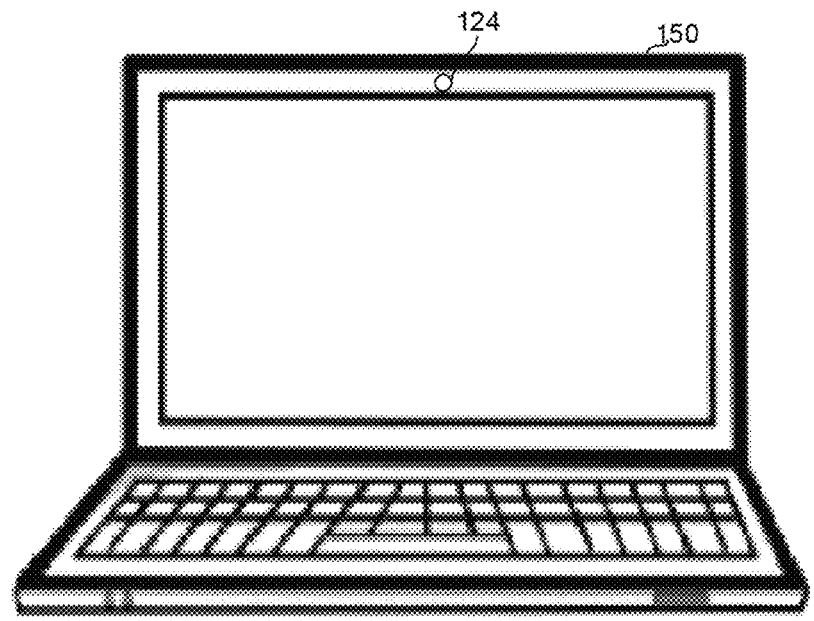
FIGS. 1B and 1C are schematic illustrations of computing systems having installed therein a capturing module, in accordance with some exemplary embodiments of the disclosed subject matter.
Figure 1C:
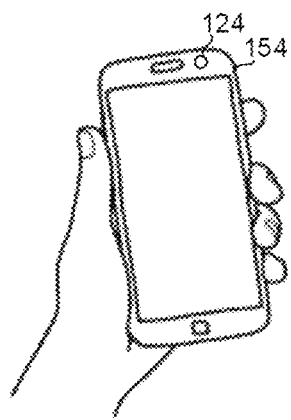

Referring now to FIG. 1B, showing an illustration of a laptop computer 150, and to FIG. 1C, showing an illustration of a mobile phone 154. Each of laptop computer 150 and mobile phone 154 may have installed therein capturing module 124, such that capturing module 124 may capture a user or the environment of laptop computer 150 or mobile phone 154, respectively. It will be appreciated that laptop computer 150 and mobile phone 154 being exemplary implementations of computing platform 100, are exemplary only, and that the capturing module 124 may be installed within any computing platform such as a surveillance system, a desktop computer, a server computer, cloud server or the like. Using capturing module 124, laptop computer 150 or mobile phone 154 provide enhanced privacy protection to their users, such that images are only output from capturing module 124 subject to certain conditions.

Figure 2:
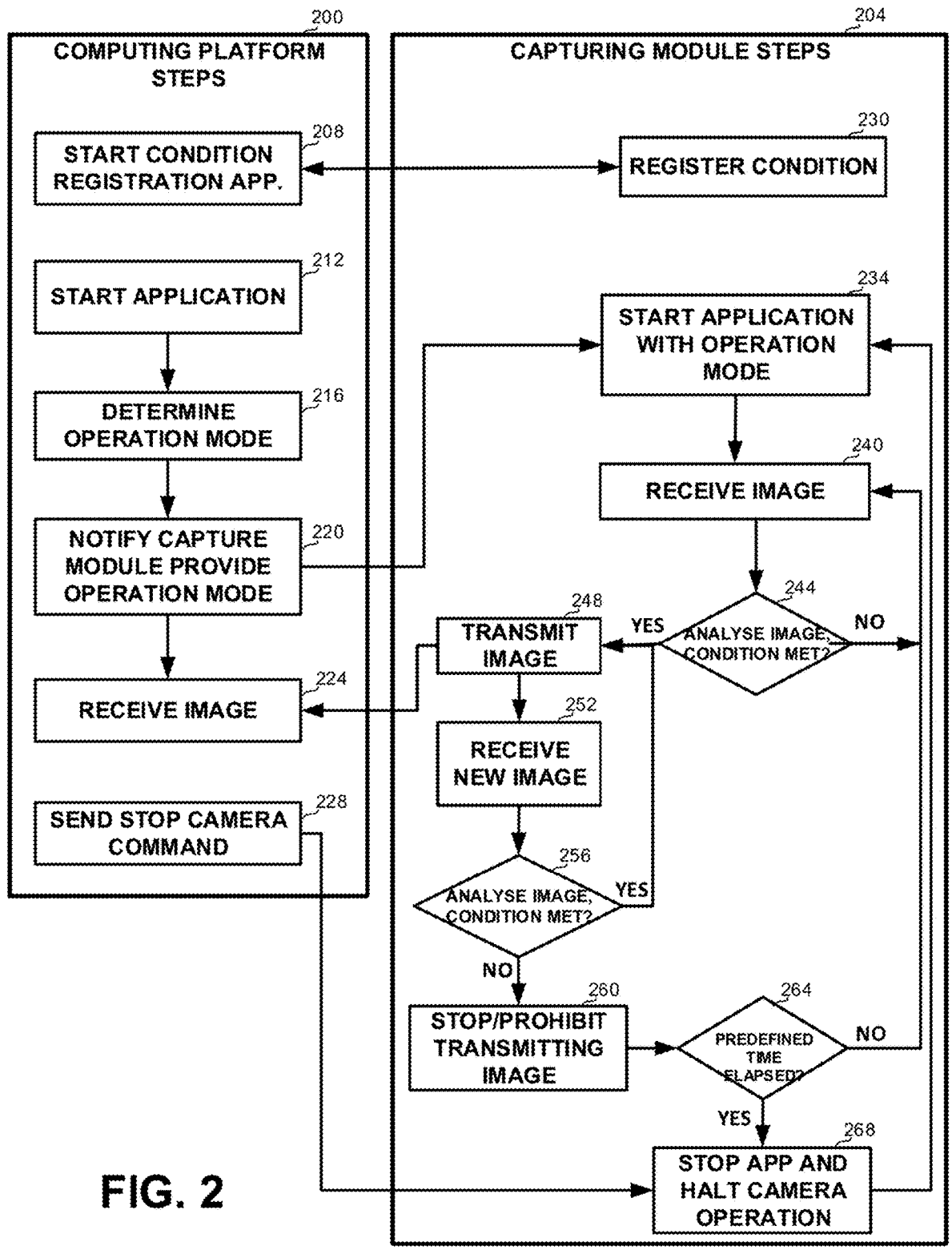
FIG. 2 is a flowchart of steps in a method for operating a capturing module, in accordance with some exemplary embodiments of the disclosed subject matter.

Referring now to FIG. 2. showing a flowchart of steps in a method for operating a computing platform with a capturing module, in accordance with some exemplary embodiments of the disclosed subject matter.

Steps 200 of FIG. 2 may be performed by a processor of a computing platform, such as processor 104 of computing platform 100, and steps 204 may be performed by a processor of a capturing module in accordance with the disclosure, such as processor 128.

On step 208, one or more registration applications may start, after being invoked, for example by a user. The registration applications may call interface 126 of capturing module 124, and on step 230 capturing module 124 may register one or more conditions for transmitting images. For example, it may capture and store images of faces of people, who may use a teleconferencing application and whose images may be transmitted.

The registration procedure may continue where processor 104 displays instructions to the user and receives input from the user, and wherein camera 144 may capture images, processor 128 may process the images, and the images or processing results thereof may be stored within images/data storage 136. For example, one application may be a registration application, which when executed stores one or more images or characteristics thereof of images of faces of people having certain privileges for one or more applications. In other embodiments, an environment may be captured during registration step 230, such that only images captured in the environment may later be transmitted.

It will be appreciated that some applications may not need any registration. For example, the application is only required to verify whether one or more faces are detected in the captured images. For these applications, registration steps 208 and 230 may be omitted.

On step 212, an application may start, for example in response to a user selecting the application, for example starting a conference call.

On step 216, processor 108 may determine an operation mode for the camera, such as whether it is required to recognize whether one or more stored faces is captured, or only to detect whether a face is captured, whether it is required to determine if the images are captured in a predetermined environment, register a new face or condition, or the like.

On step 220 processor 104 may notify processor 128 of the application starting and provide the operation mode to processor 128.

On step 234 processor 128 may start an application stored on application storage 140, and may assign the operation mode.

It will be appreciated that one or more applications may operate in one manner only, for example only detecting weather a face is detected, and thus would not require an operation mode.

On step 240 an image captured by camera 144 may be received, and on step 244 the image may be processed by processor 128 and analyzed for determining whether a condition associated with the application is met. For example, it may determine whether a face is captured, whether the face takes up at least a predetermined part of the image, whether a recognized face is captured, or the like.

If the condition is not met, execution may return to step 240 for receiving further images.

If the condition is met, then on step 248 the image, characteristic based thereon, or another indication may be transmitted to processor 104, and processor 104 may receive the transmission on step 224.

On step 252, a new image may be received from camera 144, and on step 256 the new image may be processed by processor 128 and analyzed for determining whether the condition is met for the new image. The condition checked in the second image may be the same condition as checked on step 244 for the first image, or a different condition.

If the condition is met, execution may return to step 248 for transmitting the image, characteristic, or another indication to processor 104.

If the condition is not met, then on step 260 further transmission may be prohibited and/or stopped.

In some embodiments, processing may relate to a sequence of images rather than to each single image. For example, if the condition is met in at least a predetermined percentage of the last predetermined number of consecutive images, it may be considered that the condition is met, and streaming the images may continue although some images are incompliant with the condition.

On step 264 it may be determined whether a predetermined time has elapsed, for example since the last image, characteristic or indication has been transmitted to processor 104. In some embodiments, other conditions may also be checked, for example whether the user walked away from the camera at least a predetermined number of times, the user walked away from the camera for at least a predetermined period of time, or the like.

If the time has elapsed or some other predefined condition, e.g., the user walked away at least 3 times, on step 268 execution of the application by processor 128 may be stopped and the camera operation may be halted. Execution may then return to step 234, and wait until a further command is received from processor 104.

If the stopping condition has not been met, execution may return to step 240, and wait until another image is received.

On step 228, processor 104 may send a stop camera command to processor 128, for example if the user has exited the application. Upon receiving the command, processor 128 may stop the application and close the camera on step 268.

It will be appreciated that the above embodiments are exemplary only, and that multiple other embodiments may be designed. In each such embodiment, one or more components can be fixed, replaceable, or fixed but using changeable parameters or parameter sets, while the limitations incurred by the controller on the amount of data that can be output from the processor, is maintained and cannot be worked around.

The invention may be a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as Python, MATLAB, the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A privacy protecting capturing module, comprising:
a capture device;
a memory unit for storing at least a part of an image captured by the capture device;
an interface for receiving commands and transmitting information from the capturing module, the interface enabling access to the capturing module only through a published Application Interface (API); and a processor, executing:
receiving a first image captured by the capture device;
analyzing the first image and determining whether a condition is met in the first image;
subject to the condition being met, transmitting information related to the first image through the interface;
receiving a second image captured by the capture device, the second image consequent to the first image;
analyzing the second image and determining whether a second condition is met in the second image; and
subject to the second condition being met in the second image, prohibiting transmission of further information through the interface,
wherein all accesses to the privacy protecting capturing module are through the interface, and no direct access is enabled to the capture device or to the memory unit.

2. The privacy protecting capturing module of claim 1, wherein the processor is further adapted to:
receive a third image, consequent to the second image;
determine whether the condition or the second condition is met in the third image; and
subject to the condition or the second condition being met in the third image, resume transmission of further information related through the interface.

3. The privacy protecting capturing module of claim 1, wherein the capture device, the memory device and the processor are pre-assembled as part of the module.

4. The privacy protecting capturing module of claim 1, wherein the capture device, the memory device and the processor are implemented on a single chipset or on stacked chips.

5. The privacy protecting capturing module of claim 1, wherein the capture device, the memory device and the processor are implemented on a single chip.

6. The privacy protecting capturing module of claim 1, wherein the condition relates to identifying that a face is being captured in an image.

7. The privacy protecting capturing module of claim 1, wherein the condition relates to identifying that a face selected from a predefined collection of faces is being captured in an image.

8. The privacy protecting capturing module of claim 1, wherein the condition relates to a maximal or minimal number of people being captured in an image.

9. The privacy protecting capturing module of claim 1, wherein the condition relates to a given location being captured in an image.

10. The privacy protecting capturing module of claim 1, wherein the processor further receives an indication to an operation mode from a device the privacy protecting capturing module is installed in, and wherein determining whether a condition is met in the first image or in the second image depends on the operation mode.

11. The privacy protecting capturing module of claim 1, wherein the information is the first image or the second image as captured.

12. The privacy protecting capturing module of claim 1, wherein the information is the first image or the second image as manipulated by the processor.

13. The privacy protecting capturing module of claim 1, wherein the information is a product of processing the first image or the second image by the processor.

14. The privacy protecting capturing module of claim 1, wherein determining whether a condition is met in the first image or in the second image relates to the condition being met in at least a predetermined percentage out of a predetermined number of consecutive images.

15. The privacy protecting capturing module of claim 1, wherein the processor is a signal processor.

16. The privacy protecting capturing module of claim 1, wherein the second condition is identical to the first condition.

17. The privacy protecting capturing module of claim 1, wherein the condition or the second condition is selected in accordance with an indication from an application executed by a computing platform, which calls the interface.

18. A computerized method performed by a processor, comprising:
receiving a first image captured by a capture device comprised in a privacy protecting capturing module;
analyzing by a processor comprised in the privacy protecting capturing module the first image and determining whether a condition is met in the first image;
subject to the condition being met, transmitting information related to the first image through an interface of the privacy protecting capturing module, the interface adapted to receive commands and transmit information from the capturing module, the interface enabling access to the capturing module only through a published Application Interface (API);
receiving a second image captured by the capture device, the second image consequent to the first image;
analyzing the second image and determining whether a second condition is met in the second image; and
subject to the second condition being met in the second image, prohibiting transmission of further information through the interface,
wherein all accesses to the privacy protecting capturing module are through the interface, and no direct access is enabled to the capture device or to a memory unit comprised in the privacy protecting capturing module.

19. A computer program product comprising a non-transitory computer readable storage medium retaining program instructions, which program instructions when read by a processor, cause the processor to perform a method comprising:
receiving a first image captured by a capture device comprised in a privacy protecting capturing module;
analyzing by a processor comprised in the privacy protecting capturing module the first image and determining whether a condition is met in the first image;
subject to the condition being met, transmitting information related to the first image through an interface of the privacy protecting capturing module, the interface adapted to receive commands and transmit information from the capturing module, the interface enabling access to the capturing module only through a published Application Interface (API);
receiving a second image captured by the capture device, the second image consequent to the first image;
analyzing the second image and determining whether a second condition is met in the second image; and
subject to the second condition being met in the second image, prohibiting transmission of further information through the interface,
wherein all accesses to the privacy protecting capturing module are through the interface to the processor, and no direct access is enabled to the capture device or to a memory unit comprised in the privacy protecting capturing.

\* \* \* \* \*